US012316908B2

(12) United States Patent
Li et al.

(10) Patent No.: US 12,316,908 B2
(45) Date of Patent: May 27, 2025

(54) SYSTEM AND METHOD TO MINIMIZE REPETITIVE FLASHES IN STREAMING MEDIA CONTENT

(71) Applicant: Telefonaktiebolaget LM Ericsson (publ), Stockholm (SE)

(72) Inventors: Yun Li, Lund (SE); Andreas Kristensson, Södra Sandby (SE); Fredrik Dahlgren, Lund (SE); Alexander Hunt, Tygelsjö (SE); Dan Fridh, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 18/030,536

(22) PCT Filed: Oct. 7, 2020

(86) PCT No.: PCT/EP2020/078059
§ 371 (c)(1),
(2) Date: Apr. 6, 2023

(87) PCT Pub. No.: WO2022/073596
PCT Pub. Date: Apr. 14, 2022

(65) Prior Publication Data
US 2023/0370676 A1  Nov. 16, 2023

(51) Int. Cl.
*H04N 21/44* (2011.01)
*H04N 19/567* (2014.01)
(Continued)

(52) U.S. Cl.
CPC ..... *H04N 21/44008* (2013.01); *H04N 19/567* (2014.11); *H04N 21/440245* (2013.01); *H04N 21/845* (2013.01); *H04N 19/523* (2014.11)

(58) Field of Classification Search
None
See application file for complete search history.

(56) References Cited

U.S. PATENT DOCUMENTS

| 6,515,709 B1 | 2/2003 | Kamada | |
|---|---|---|---|
| 2007/0074266 A1* | 3/2007 | Raveendran | H04N 19/172 725/94 |

(Continued)

FOREIGN PATENT DOCUMENTS

| EP | 0940671 A1 | 9/1999 |
|---|---|---|
| EP | 1119979 B1 | 1/2013 |

(Continued)

OTHER PUBLICATIONS

Author Unknown, "Photosensitive epilepsy", Wikipedia, <https://en.wikipedia.org/w/index.php?title=Photosensitive_epilepsy&oldid=946643302>, Mar. 21, 2020, 1-8.

(Continued)

*Primary Examiner* — Benjamin R Bruckart
*Assistant Examiner* — Charles N Hicks
(74) *Attorney, Agent, or Firm* — Murphy, Bilak & Homiller, PLLC

(57) ABSTRACT

An image processing system (100) and method therein for processing streaming media content to reduce disturbing spatial and/or temporal phenomena before being displayed on a device display. The image processing system (100) receives media stream comprising sequences of video frames into a buffer (110) and analyzes the video frames during streaming. The analyzing (130) is performed either on completely decoded or partially decoded video frames within a Group of Picture (GOP) to detect disturbing spatial and/or temporal phenomena. If a disturbing spatial and/or temporal phenomenon is detected, the image processing system (100) processes (140) the decoded video frames to reduce the disturbing spatial and/or temporal phenomenon (Continued)

based on user settings of the device and displays the processed video frames on the display (150).

22 Claims, 4 Drawing Sheets

(51) Int. Cl.
*H04N 21/4402* (2011.01)
*H04N 21/845* (2011.01)
*H04N 19/523* (2014.01)

(56) References Cited

U.S. PATENT DOCUMENTS

| | | |
|---|---|---|
| 2008/0232765 A1* | 9/2008 | Patten ............ G11B 27/3036 386/300 |
| 2009/0238284 A1 | 9/2009 | Farmer et al. |
| 2014/0150012 A1 | 5/2014 | Mountain |
| 2015/0264313 A1 | 9/2015 | Bright-Thomas |
| 2018/0088669 A1 | 3/2018 | Ramaprakash et al. |
| 2019/0318651 A1 | 10/2019 | Fenyvesi et al. |
| 2020/0021718 A1 | 1/2020 | Barbu et al. |

FOREIGN PATENT DOCUMENTS

| | | |
|---|---|---|
| EP | 2610780 A2 | 7/2013 |
| WO | 0163937 A2 | 8/2001 |
| WO | 03090168 A1 | 10/2003 |
| WO | 2013083199 A1 | 6/2013 |

OTHER PUBLICATIONS

Drummond, Peter D., "Photophobia and autonomic responses to facial pain in migraine", Brain, vol. 120, pp. 1857-1864, Oxford University Press, 1997, 9 pages.

Gul, Serhan, et al., "Hybrid Video Object Tracking in H.265/HEVC Video Streams", 2016 IEEE 18th International Workshop on Multimedia Signal Processing (MMSP), 2016, 1-5.

Meng, Jianhao, et al., "Scene Change Detection in a MPEG Compressed Video Sequence", Proceedings of SPIE, vol. 2419, XP000670965, 1995, 14-25.

Pei, Soo-Chang, et al., "Efficient MPEG Compressed Video Analysis Using Macroblock Type Information", IEEE Transactions on Multimedia, vol. 1, No. 4, Dec. 1999, 321-333.

Sullivan, Gary J., et al., "Overview of the High Efficiency Video Coding (HEVC) Standard", IEEE Transactions on Circuits and Systems for Video Technology, vol. 22, No. 12, Dec. 2012, 1649-1668.

Yeo, Boon-Lock, et al., "Rapid Scene Analysis on Compressed Video", IEEE Transactions on Circuits and Systems for Video Technology, vol. 5, No. 6, Dec. 1995, 533-544.

\* cited by examiner (a)  (b)

SYSTEM AND METHOD TO MINIMIZE REPETITIVE FLASHES IN STREAMING MEDIA CONTENT

TECHNICAL FIELD

Embodiments herein relate to method and system for image processing. In particular, the embodiments relate to an image processing system and method to minimize repetitive flashes in streaming media content.

BACKGROUND

Repetitive flashing or flickering light when watching media content is a discomfort on different levels to different people and having a way to reduce said problem on a personal basis would be beneficial.

It is also evident that intensive visual stimulations such as flashing or flickering light may cause migraine headache to some individuals, e.g. as described in P. D. Drummond, "Photophobia and autonomic responses to facial pain in migraine", *Brain, A journal of neurology*, Vol. 120, Issue10, October 1997, P1857-1864, and it might even trigger seizures. The flashing light may be in the form of bright sunlight, head light from a car in the dark night, and light from a computer or TV display. The existing solution to address the problem for individuals is the use of special eyeglasses, which may either filter out some components of the light or dampen the light intensity.

Especially Photosensitive epilepsy (PSE) is a form of epilepsy in which seizures are triggered by visual stimuli that form patterns in time or space, such as flashing lights; bold, regular patterns; or regular moving patterns, as described in Wikipedia.

Although the solution of eyeglasses can work for some individuals, these types of glasses may not be always available, and they might introduce discomfort while wearing them, especially for home entertainments, e.g. when watching streaming media content on a TV display.

There are also techniques to perform analysis and processing on video frames to mitigate flashing effects. However, analyzing a long video stream into the future requires a large memory if the video frames are only decoded once, or consumes significant extra power if the frames are decoded more than once.

SUMMARY

It is therefore an object of embodiments herein to provide an improved method and system for processing streaming media content to reduce these disturbing spatial and/or temporal phenomena before being displayed on a device display.

According to an aspect of embodiments herein, the object is achieved by an image processing system and a method therein for processing streaming media content to reduce disturbing spatial and/or temporal phenomena before being displayed on a device display. The image processing system receives media stream comprising sequences of video frames into a buffer. The image processing system analyzes the video frames during streaming. The analyzing is performed either on completely decoded or partially decoded video frames within a Group of Picture (GOP) to detect disturbing spatial and/or temporal phenomena. If a disturbing spatial and/or temporal phenomenon is detected, the image processing system processes the decoded video frames to reduce the disturbing spatial and/or temporal phenomenon based on user settings of the device. The image processing system displays the processed video frames on the display.

The embodiments herein provide an improved system and method to analyze buffered video frames during video streaming either from completely decoded video frames or from partially decoded video frames, i.e. partially decompressed bit-stream. Based on the brightness changes of consecutive frames, it is identified which compensation might be required for future frames, and an image processing filter is applied on the content to minimize flashes or flickering as well as to handle repetitive patterns in spatial and temporal domain before the video sequences are displayed on a device display.

Advantage of the image processing system according the embodiments herein is that a solution implemented as part of the display system could prevent user discomfort originating from repetitive flashes or flickering and certain patterns caused by streaming media content being displayed on said display. This could also remove one parameter that is known to cause migraine headache to some individuals and have some positive impact on photosensitive epilepsy.

In addition, by analyzing bit-stream in compressed domain, only partial decoding is required for the analysis. Therefore, both memory and power consumption can be reduced, especially when a long sequence of video frames is required to be analyzed well ahead of time before rendering on the display.

Therefore, the embodiments herein provide an improved system and method for processing streaming media content to reduce the disturbing spatial and/or temporal phenomena before being displayed on a device display.

BRIEF DESCRIPTION OF THE DRAWINGS

Examples of embodiments herein are described in more detail with reference to attached drawings in which.

DETAILED DESCRIPTION

Figure 1:
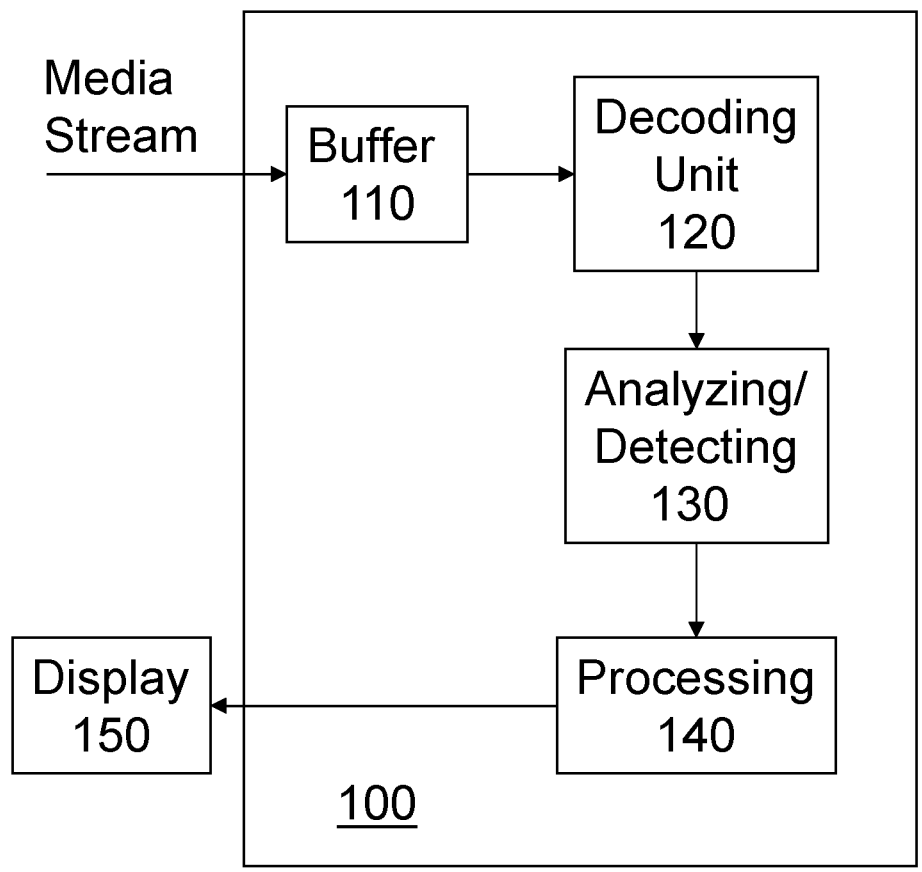
FIG. 1 is a schematic block overview illustrating an image processing system according to embodiments herein.

FIG. 1 shows an image processing system 100 for processing streaming media content to reduce disturbing spatial and/or temporal phenomena before being displayed on a device display according to embodiments herein. The image processing system 100 comprises a buffer 110 to receive media stream data comprising sequences of video frames. The image processing system 100 further comprises a decoding unit 120 to decode the received media stream data.

Figure 2:
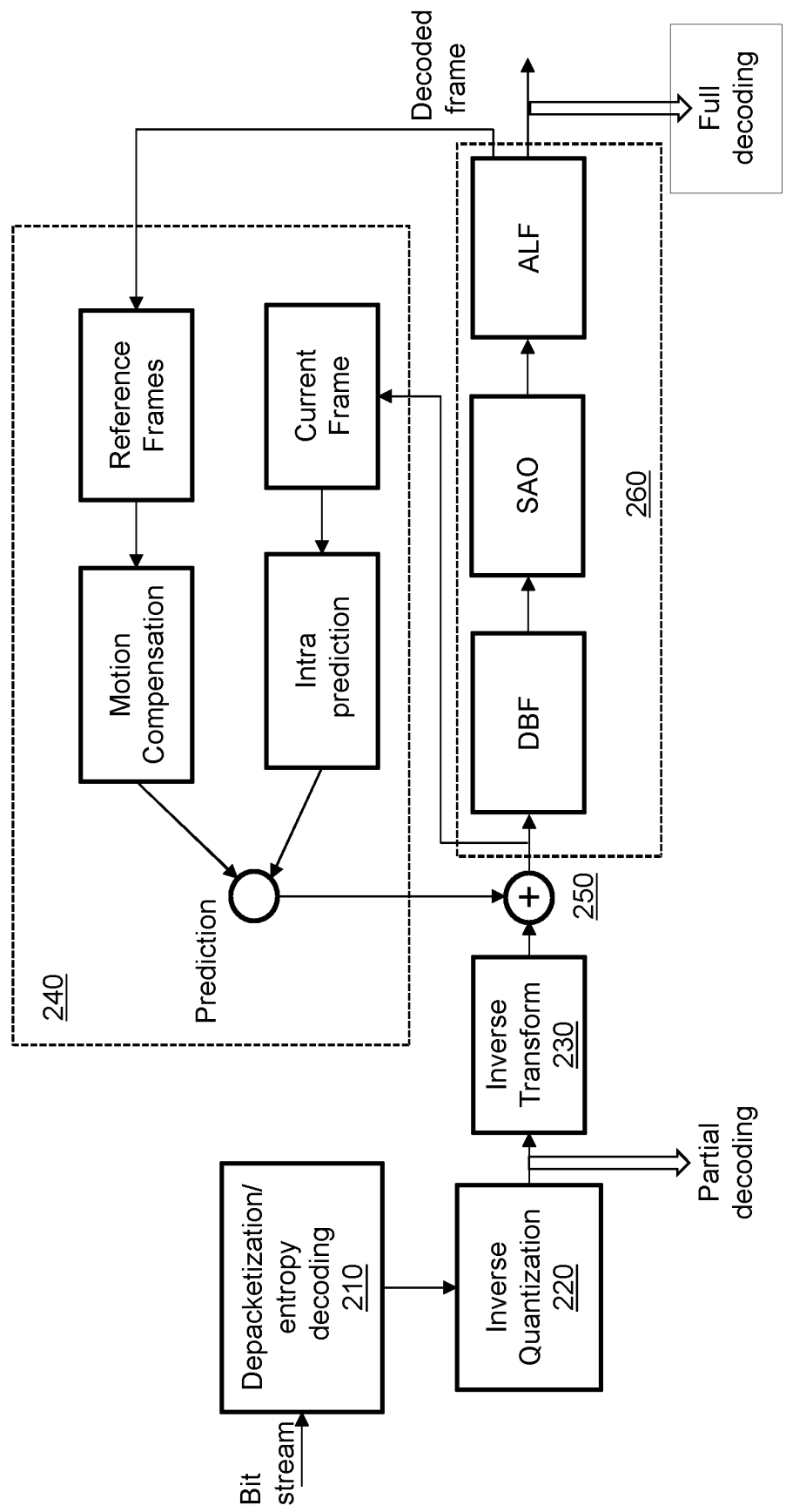
FIG. 2 is a schematic block view illustrating an example of decoding unit.

FIG. 2 shows a block function diagram of an example of the decoding unit 120. The decoding process comprises the following steps:

210. The compressed bit stream is de-packetized and entropy-decoded.

220. The coefficients of residues are inverse-quantized.

The received data in the buffer is now partially decoded, i.e. partially decompressed bit-stream is generated after entropy decoding.

230. The inverse-quantized coefficients are inverse-transformed.

240. The intra prediction and inter prediction are performed from the previously reconstructed signals to obtain the prediction signals. The intra prediction predicts a block of image by using reconstructed image within the same image frame whereas the inter prediction predicts a block of image from reference frames, which may be either past or future frames. The inter prediction is performed by using motion vectors with motion compensation.

250. The prediction signals are added back to the inverse-transformed residues to recover the reconstructed signals.

260. The reconstructed signals are filtered by Deblocking-Filter (DBF), nonlinear amplitude mapping with Sample Adaptive Offset (SAO), and Adaptive Loop Filter (ALF).

A video frame is fully reconstructed after the filtering and completely decoded video frames are generated.

According to embodiments herein, the image processing system 100 further comprises an analyzing and detecting unit 130 for analyzing and detecting disturbing spatial and/or temporal phenomena during media content streaming. The analyzing and detecting may be performed either on the completely decoded video frames or on the entropy decoded, i.e. partially decoded or decompressed bit-stream within a Group of Picture (GOP).

The disturbing spatial and/or temporal phenomena may be a brightness change in a certain frequency such as repetitive flashing or flickering lights, and the certain frequency is herein referring the repetition frequency. The disturbing spatial and/or temporal phenomena may also be repetitive flash patterns, repetitive spatial patterns, repetitive spatial and temporal patterns, rapid scene changes, brightness changes of consecutive frames, patterns that affect a person with photosensitivity problem in general, etc.

The image processing system 100 further comprises a processing unit 140 configured to process the decoded video frames to reducing the disturbing phenomenon based on user settings of the device if disturbing spatial and/or temporal phenomena is detected.

The image processing system 100 then sends the processed video frames to the display 150 for displaying or rendering.

The proposed solution according to embodiments herein is to analyze buffered video frames during video streaming either on completely decoded video frames or on partially decoded video frames, i.e. partially decompressed data or bit-stream. Based on the detected disturbing phenomena, e.g. flashes or flickering, brightness changes of consecutive frames, it is identified which compensation might be required for future frames, and an image processing filter may be applied on the media content to minimize flashes or flickering as well as to handle repetitive patterns in spatial and temporal domain before the video sequences are displayed on a device display.

Figure 3:
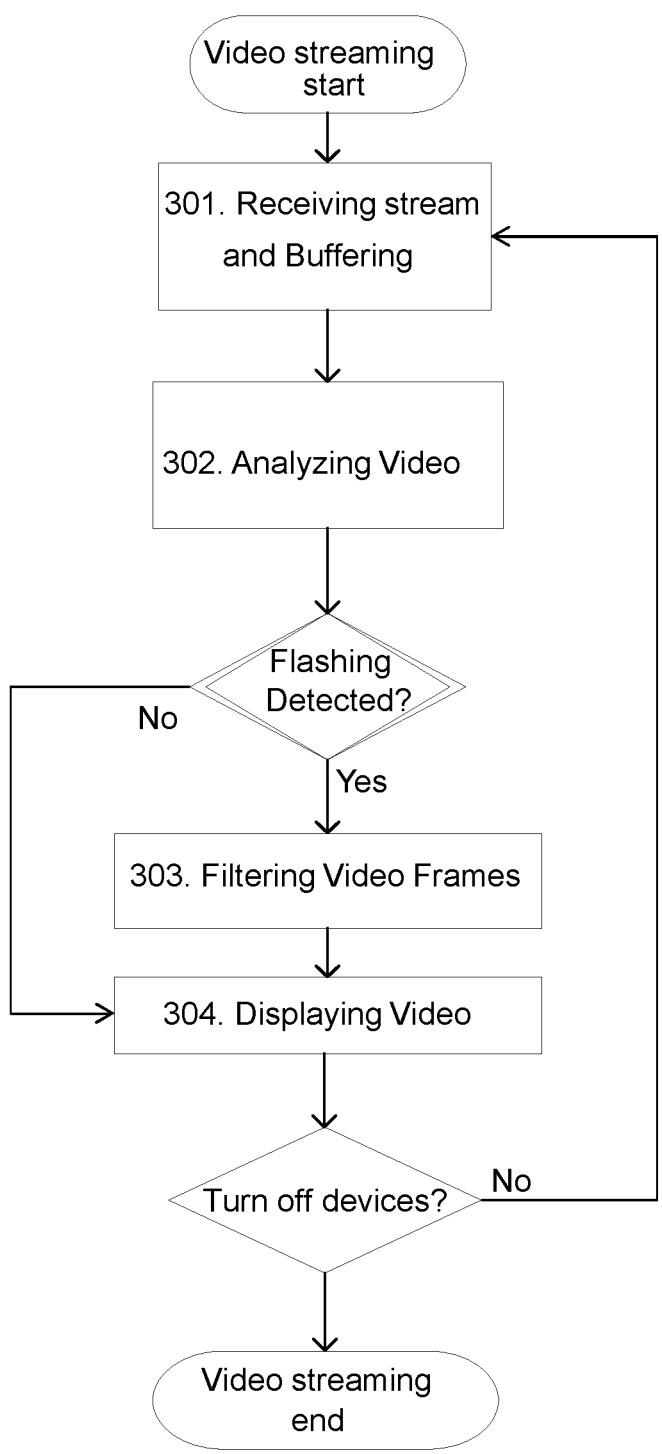
FIG. 3 is a flow chart illustrating a method performed in the image processing system according to embodiments herein.

A method performed in the image processing system 100 for processing streaming media content to reduce disturbing spatial and/or temporal phenomena before being displayed on a device display according to embodiments herein will be described in more detail with reference to FIG. 3. It starts with receiving the media stream into a buffer, e.g. the buffer 110, and the compressed video frames are decoded from the buffer 110 in e.g. the decoding unit 120. Thereafter, the brightness changes for the consecutive frames are analyzed in e.g. the analysing and detecting unit 130. If a flashing pattern is detected, the video frames are filtered before rendering on the display. The method comprises the following actions which may be performed in any suitable order.

Action 301

When a video streaming starts, the image processing system 100 receives media content stream comprising a sequence of video frames and buffers the received video frames.

Action 302

The image processing system 100 analyzes the video frames during streaming to detect disturbing spatial and/or temporal phenomena. The analyzing and detecting may be performed either on the completely decoded video frames or on the entropy decoded, i.e. partially decoded video frames within a Group of Picture (GOP). Due to inter-prediction, video frame sequences are reordered, especially with a recursive prediction structure. Certain bi-directional frames are only decodable when all other frames in a Group of Picture (GOP) are decoded. Therefore, analyzing the decoded video frames within a GOP is unlikely to increase the resource consumption for the decoder.

After the video frames within the GOP are decoded, according some embodiments herein, analyzing the video frames may be performed by using a neural network to recognize the disturbing flash patterns, repetitive spatial patterns, and repetitive spatial and temporal patterns. This requires training data to train the image processing system 100.

According some embodiments herein, analyzing the video frames may comprise estimating average luminance intensity for each completely or partially decoded video frame as a brightness sequence. For detecting the flash patterns, the average luminance intensity for each decoded video frame is calculated as a brightness sequence. A Discrete Cosine Transform (DCT) is applied on this sequence. Because the transform coefficients indicate the contributions of each frequency band in the brightness signal, if the coefficients of some frequency bands are greater than a threshold, it is assumed that the brightness change for the video frames is significant and flash patterns are detected, then reactions need to be taken. Consequently, a decision if disturbing spatial and/or temporal phenomena is detected may be made by checking if the DCT coefficients of some frequency bands are higher than a threshold.

According some embodiments herein, the completely decoded video frames may be transformed e.g., by using Fourier transform, or by Wavelets, a classifier may be trained to recognize the repetitive patterns from the frequency domain.

According some embodiments herein, the repetitive patterns may be identified through autocorrelation within one video frame and cross-correlation between video frames, which are completely decoded. Both autocorrelation and cross-correlation may be performed either from frequency domain or from pixel domain.

According to some embodiments herein, the intensity of the light in the detected flashes may be analyzed relative to the ambient light in the room where the display is located to determine whether they are problematic before compensation processing, as well as the light intensity on the adjusted settings after compensation processing. This is especially important for people that are more sensitive to flashes or flickering in darker rooms. This may be performed by comparing the intensity of the light in detected flashes with the ambient light where the display is located to determine whether the difference between them is greater than a threshold. The threshold may be different for different users and may be set by user settings of the device.

According to some embodiments herein, it is feasible to analyze the video frames directly in the compressed domain by using machine learning techniques, e.g., neural networks. Moreover, some image compression codecs do not perform prediction, e.g., JPEG. Brightness may then be inferred from the DCT transform coefficients directly.

For some video codec, such as H.265 video codec, it is proposed herein a compressed domain luminance intensity estimation method after partial decoding, for detecting the disturbing spatial and/or temporal phenomena.

Intensity estimation in the compressed domain is possible mainly due to the property of Discrete Cosine Transform (DCT) and prediction. The transform is formulated as $X'=DXD^T$, where D is the DCT matrix, and X is the signal to be transformed. The prediction with residue R as $R=X-X_1$, where $X_1$ is the prediction source, and X to be predicted. Applying the transform to the prediction residue, $D(X-X_1)D^T = DXD^T - D X_1 D^T$, that is to say the transform of the residue is equal to the prediction after the transform. Furthermore, the DC component of DCT represents the average intensity of the signal.

Figure 4:
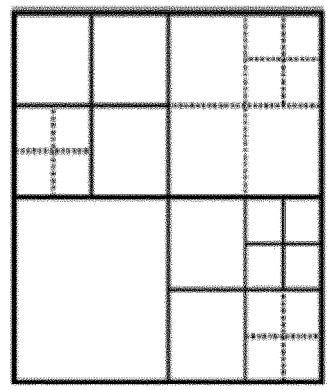
FIG. 4 is a schematic view illustrating an example subdivision of a Coding Tree Blocks (CTB) into Coding Blocks (CBs)
Figure 4:
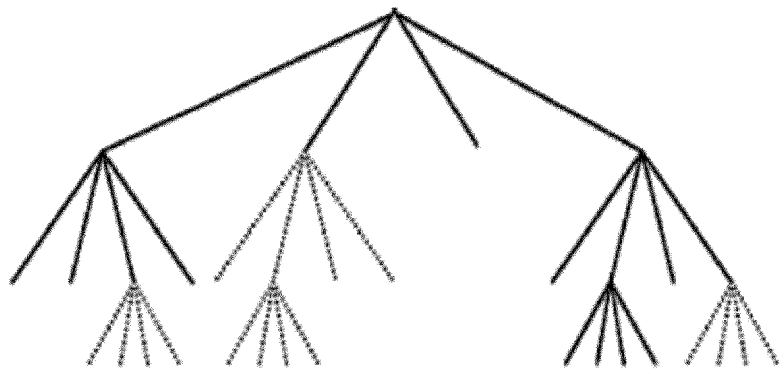

However, for a practical video codec, the above theory cannot be simply applied to estimate the actual average signal intensity. This is because modern codecs are much more complicated than what it is described so far. In video compression with H.265 codec, an image frame is split into Coding Tree Unit (CTU) up to 64 by 64 pixels, which associated with Coding Tree Blocks (CTB). A CTB is then recursively split into Coding Blocks (CBs) of size from 64 by 64 down to 8 by 8, and a CB may be further split into Prediction Blocks (PBs), on which intra prediction and inter prediction operate. After the prediction, a transform is applied recursively within the CB. The possible Transform block (TB) size is from 4 by 4 to 32 by 32. FIG. 4 shows an example subdivision of a CTB into CBs and corresponding TBs, where (a) shows CTB with its partitioning, (b) shows corresponding quadtree. Solid lines indicate CB boundaries and dotted lines indicate TB boundaries. The transform uses an integer based DCT in general, except for the 4 by 4 transform of luma intra prediction residue signal, which can alternatively apply a Discrete Sine Transform (DST). The splitting of the CB, PB and TB is based on a rate-distortion optimization, which minimizes the bit-rate and the distortion with a Lagrange multiplier.

In the following, approximation of average luminance intensity for intra predicted and inter-predicted blocks will be described in more detail.

For Intra Predicted Blocks:

After entropy decoding of a video frame, the luma residue signals, block splitting, prediction modes, and motion vectors (for inter predicted frame) are generated. For different scenarios, the estimated intensity for each TB may be computed as follows:

I. For TBs with DCT transform:
  a. For Directly coded blocks without predictions: The DC component of DCT transform of the current TB is the average luminance intensity of a directly coded block.
  b. For PBs with angular prediction: Angular prediction is to predict the current block from its reconstructed blocks, and the position of the prediction source is determined by a direction, which is represented by an angle. Calculating average luminance intensity for a PB with angular prediction comprises identifying locations of prediction pixels, from which a current transform block (TB) is predicted, calculating an average intensity of the prediction pixels and summing the average intensity of the prediction pixels and the DC value of the DCT of the current TB as the average intensity of the current TB. The average intensity of the prediction pixels avt can be computed from the average of the prediction pixels directly. The average intensity of the current TB is then the DC value of the DCT of the current TB plus avt. The estimation is under an assumption that each TB is relatively homogenous in the pixel domain, as a homogenous region relates to low energy in high frequency components in the DCT domain. This homogeneity is driven by the rate-distortion optimization. For some splitting, e.g., one TB contains multiple PBs, intensity for each part of the TB related to a PB is estimated separately, and the estimated intensities of each part of TB related to respective PBs are aggregated and averaged to calculate the average intensity of the TB.

II. For TBs with DST transform:
   DST transform does not have a DC component. Either an inverse DST needs to perform to obtain the intensity, or an interpolation or extrapolation may be conducted from the reconstructed neighboring intensity to fill this missing TB. Therefore according to some embodiments herein, for TBs with DST, an inverse DST is applied to these TBs to calculate the intensity, or an interpolation or extrapolation is conducted from the reconstructed neighboring intensity to calculate the intensity for these TBs.

III. For blocks with Intra Pulse Code Modulation (I_PCM) coding mode:
   The prediction, transform and quantization are skipped in this coding mode, and the averaged intensity may be inferred from the coded bits directly, i.e., to compute the average of the signals.

IV. For blocks with Lossless and transform skipping coding mode:
  a. Directly coded block without prediction: The average intensity is computed by averaging the luma residue signals within the TB.
  b. Coded block with angular prediction: The average intensity is computed as in b) described above for TBs with DCT transform. That is locations of prediction pixels are identified, an average intensity avt for the prediction pixels is computed. The average intensity of the current TB is the average intensity of the luma residue signals plus avt.

V. For blocks with other coding modes:
   In case there are other novel coding modes present, it either needs to invoke an inverse method to decode a block to pixel domain for computing its average intensity, or it may be left as a missing block to be interpolated or extrapolated from the neighboring reconstructed intensity.

For Inter-Predicted Blocks:

An inter-predicted block in a current frame in the context of inter-frame prediction is a block that is predicted from blocks in reference frames. An inter-predicted block can apply a single hypothesis or multiple hypotheses, e.g. two hypotheses in High Efficiency Video Coding (HEVC), for prediction.

In the case of a single hypothesis prediction, the source block in the prediction frame can be determined by using the motion vectors for the PB that resides in the current TB. Then the average intensity of the source block is estimated as the average luminance intensity of the current TB.

For multiple hypotheses prediction, multiple source blocks for the PB that resides in the current TB are identified. The intensities from the multiple source blocks are estimated and further averaged. The average intensity of the current TB is then the DC component of its DCT plus the average intensity of the multiple source blocks.

For blocks with other novel modes of irregularity, the average intensity is calculated in the same way as described in the above section for intra-predicted blocks.

As described above, in the analysis of a video stream, buffered video frames are entropy decoded, and the luminance intensity is estimated for each frame. For reducing memory consumption, it is only needed to store the following for the current GOP in the memory: the estimated intensity map for each frame together with its CB, PB and TB splitting, prediction modes and motion vectors. For previous GOP, only the estimated intensity maps are needed. In order to reduce the memory consumption further, the estimated intensity maps may also be down-sampled. The intensity map is basically referring to a one channel image of luminance intensity.

After the intensity maps are estimated, analysis may be performed by using image domain processing technique mentioned above for the partially decoded frames for detecting the anomaly in brightness. In addition, these maps are estimated in a block-wise manner, which may result in a rough estimated lowpass-filtered version of the original image frame. This implies that detection methods for the fully decoded frames mentioned above may also be applied.

According to some embodiments herein, abnormal scene cut, a disturbing phenomenon for some people, may also be detected in compressed domain. With rapid scene change, it is likely that a significant portion of the image is intra-predicted. This is reflected in the areas covered by PBs with intra modes. By setting a threshold to the size of intra mode area, potential continuous scene cut may be detected. Additionally, by applying object tracking methods on the motion vector, e.g., by using spatial-temporal Markov random field, it is also possible to detect anomalies on scene changes, e.g., two scenes repeating continuously.

Action 303

The image processing system 100 processes the decoded video frames to reducing disturbing spatial and/or temporal phenomena based on user settings of the device if a disturbing spatial and/or temporal phenomena is detected.

The user settings of the device may comprise a default setting where processing the video frames is always performed when disturbing phenomenon is detected, or processing the video frames when the detected disturbing phenomenon is above a threshold.

According to some embodiments herein, the image processing system 100 may send an indication to the user to indicate that disturbing phenomenon is detected to enable the user to choose whether to process the video frames to reduce the disturbing phenomenon.

According to some embodiments herein, the image processing system 100 may process the video frames by using a physical filter mask attached to the display and the physical filter is controlled based on user settings of the device. For example, a TV system may control the physical filter to take action based on the decision from the "video analyzing" process.

According to some embodiments herein, the image processing system 100 may process the video frames by filtering the video frames. After detecting a disturbing spatial and/or temporal phenomenon, e.g. a significant brightness change, the entire GOP of video frames may be filtered. The filtering process may, in one embodiment, reduce or halve the intensity levels for all the video frames under processing.

In another embodiment, a global contrast and brightness adjustment may be performed for the video frames.

In some cases, the patients are especially susceptible to some color components, e.g., blue. Hence, actions may be taken to reduce a color component of the video frames.

Additionally, the filtering may take into account the brightness value sequence stored in the memory from the previous GOP so that a gradual smooth brightness transition may be applied between two filtering sequences.

In another embodiment, the filtering may be conducted in the frequency domain for repetitive patterns, for which, the video frames are transformed, e.g., by using Fourier transform, and certain frequencies with high energy are removed. The filtered video frames are then inverse transformed back from the frequency domain.

According to some embodiments herein, the image processing system 100 may process the video frames by filtering the detected flashing sequence such that the initial flash is either kept or set to have a fairly high brightness whereas the subsequent flashes in the same sequence are substantially reduced. This may provide some of the visual effect while still avoid a repetitive stark flashing sequence that is troublesome for certain people.

In some embodiments, the image processing system 100 may process the video frames by filtering the detected flashing such that the flashing is reduced in its luminance and at the same time changed in its color setting. The flashing may be substantially reduced in its luminance and changed in its color setting so that the visual effect of repetitive flashing is to some extent kept but instead of stark repetitive brightness effects that some people is sensitive to, it is now moved into repetitive changes in color representation of parts of the scenes which those people might be less sensitive to.

In one embodiment, the "flashes" and the "other material", e.g. video content, may be separated after the analysis and then be sent on different channels. A way may be implemented for different users to see different channels. One way could be to send flashes polarized in a certain way, and then let users sensitive for flashes use glasses that block that polarized channel. For example, a TV needs a special controllable polarized filter on the display. The video contents are classified as "harmful" and "other" materials. Those "harmful" contents are polarized by the TV filter such that they are later fully blocked or partially blocked by the glasses while the "other" contents are polarized to pass the glasses. In addition, only the viewers with photosensitivity problem should wear the polarized glasses.

Action 304

The image processing system sends and displays the processed video frames on the display, i.e. the filtered video frames are rendered on the display.

The image processing system (100) performs Actions 301-304 until the video streaming is ended or the device is turned off.

To summarize, the image processing system 100 and method therein according to embodiments herein provide an improved method and system for processing streaming media content to reduce disturbing spatial and/or temporal phenomena before being displayed on a device display. The proposed system may reduce flashes or flickering in streamed media content and may also minimize the risk of migraine caused by flashes or flickering for individuals sensitive to that aspect when watching said content. The processing may be performed without additional hardware. In addition, a method for intensity approximation from video codecs is proposed and the proposed system utilizes compressed domain analysis to reduce memory and power consumption for devices. By analyzing bit-stream in compressed domain, only partial decoding is required for the analysis. Therefore, both memory and power consumption can be reduced, especially when a long sequence of video frames is required to be analyzed well ahead of time before rendering on the display.

Figure 5:
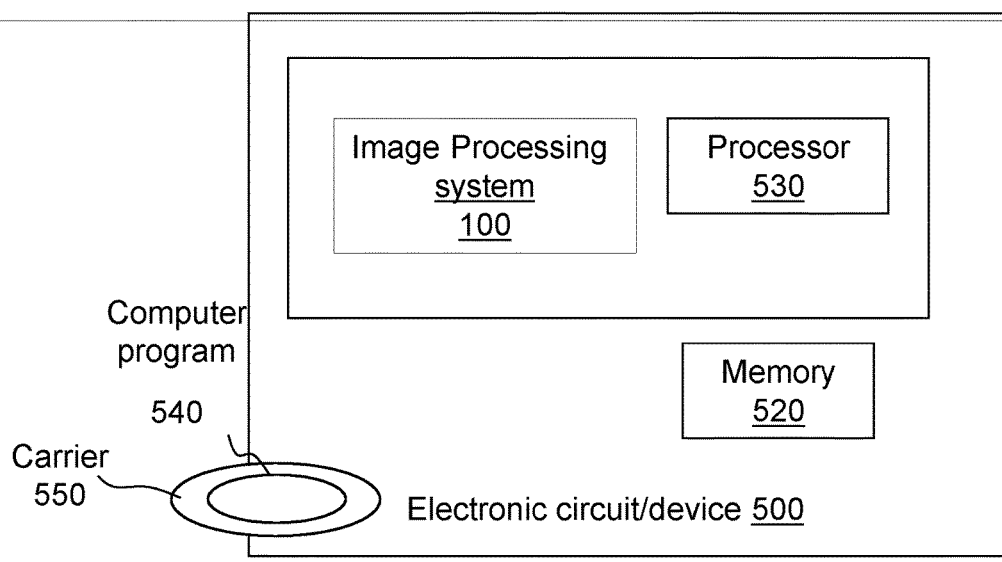
FIG. 5 is a block diagram illustrating an electronic device in which the image processing system according to embodiments herein is implemented.

The image processing system 100 according to the embodiments herein may be employed in various electronic circuits or device, which may be any one of a computer, a TV, a mobile phone, a video camera, a tablet, a multimedia device. FIG. 5 shows a block diagram for an electronic device 500. The electronic device 500 may comprise other units, where a memory 520, a processor 530 are shown.

Those skilled in the art will appreciate that the buffer 110, the decoding unit 120, the analyzing and detecting unit 130, the processing unit 140 comprised in the image processing system 100 may be referred to one unit, one or more processors, such as the processor 530 configured with software and/or firmware and/or any other digital hardware performing the function of each unit.

The image processing system 100 may comprise a processor configured to perform the Actions 301-304 described above for processing streaming media content to reduce disturbing spatial and/or temporal phenomena before being displayed on a device display.

The embodiments herein may be implemented through one or more processors, such as the processor 530 in the electronic device 500 together with computer program code 540 for performing the functions and actions of the embodiments herein. The program code 540 may also be provided as a computer program product 550, for instance in the form of a data carrier carrying computer program code for performing the embodiments herein when being loaded into the electronic device 500. The computer program code may furthermore be provided as pure program code on a server or cloud and downloaded to the electronic device 500.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in an image processing system for processing streaming media content to reduce disturbing spatial and/or temporal phenomena before being displayed on a display of a device, the method comprising:
receiving a media stream comprising sequences of video frames into a buffer;
analyzing the video frames during streaming, wherein the analyzing is performed on partially decoded video frames within a Group of Picture (GOP) to detect disturbing spatial and/or temporal phenomena, wherein partially decoded video frames are video frames generated Partway through a decoding process;
if a disturbing spatial and/or temporal phenomenon is detected, processing the video frames to reduce the disturbing spatial and/or temporal phenomenon based on user settings of the device; and
displaying the processed video frames on the display.

2. The method according to claim 1, wherein the disturbing spatial and/or temporal phenomena is any one of repetitive flashing or flickering lights represented as a strong brightness variation in a certain frequency, repetitive flash patterns, repetitive spatial patterns, repetitive spatial and temporal patterns, rapid scene changes, brightness changes of consecutive frames, or patterns that affect a person with photosensitivity problem.

3. The method according to claim 1, wherein analyzing the video frames comprises estimating average luminance intensity for each video frame.

4. The method according to claim 3, wherein analyzing the video frames further comprises storing, for a current GOP, an estimated luminance intensity map for each frame together with its Coding Block, Prediction Block (PB), and Transform Block (TB) splitting, prediction modes and motion vectors, and for a previous GOP, storing only estimated luminance intensity maps, and wherein partially decoded video frames in the current GOP are analyzed to detect disturbing spatial and/or temporal phenomena based on that which is stored for the current GOP and the previous GOP.

5. The method according to claim 1, wherein analyzing the video frames comprises transforming the partially decoded video frames into a frequency domain and using a classifier trained to recognize repetitive flash patterns from the frequency domain.

6. The method according to claim 3, wherein analyzing the video frames comprises identifying repetitive patterns through autocorrelation within one decoded image frame and cross-correlation between several decoded image frames.

7. The method according to claim 3, wherein, for blocks with angular prediction, estimating average luminance intensity for each video frame comprises identifying locations of prediction pixels from which a current TB is predicted, calculating an average intensity of the prediction pixels and summing the average intensity of the prediction pixels and the DC value of the Discrete Cosine Transform (DCT) of the current TB as the average intensity of the current TB.

8. The method according to claim 3, wherein, for TBs with Discrete Sine Transform (DST), an inverse DST is applied to these TBs to calculate an intensity, or an interpolation or extrapolation is conducted from the reconstructed neighboring intensity to calculate the intensity for these TBs.

9. The method according to claim 3, wherein, for inter-predicted blocks with a single hypothesis prediction, estimating average luminance intensity for each video frame comprises determining a source block in a prediction frame using motion vectors for a PB that resides in a current TB, estimating an average intensity of the source block as the average luminance intensity of the current TB.

10. The method according to claim 3, wherein, for inter-predicted blocks with multiple hypothesis prediction, estimating average luminance intensity for each video frame comprises identifying source blocks for a PB that resides in a current TB, estimating an average intensity of the source blocks, and summing the DC component of the Discrete Cosine Transform of the current TB and the average intensity of the source blocks as the average intensity of the current TB.

11. The method according to claim 3, wherein, for a block with Intra-Pulse Code Modulation (IPCM) coding mode, an averaged intensity of the block is inferred from coded bits directly.

12. The method according to claim 3, wherein, for TBs with lossless and transform skipping mode, for a directly coded block without prediction, an average intensity is computed by averaging signals within the TB, and for a block with angular prediction, estimating average luminance intensity comprises identifying locations of prediction pixels from which a current TB is predicted, calculating an average intensity of the prediction pixels and summing the average intensity of the prediction pixels and the DC value of the Discrete Cosine Transform of the current TB as the average intensity of the current TB.

13. The method according to claim 3, wherein, for a splitting where one TB contains multiple PBs, an intensity for each part of the TB related to a PB is estimated, and the intensities of each part of the TB related to respective PBs are averaged as the average intensity of the TB.

14. The method according to claim 1, wherein the user settings of the device comprising a default setting where processing the video frames is either:
   always performed when a disturbing phenomenon is detected, or
   performed only when the detected disturbing phenomenon is above a threshold.

15. The method according to claim 1 further comprising sending an indication to a user to indicate that a disturbing phenomenon is detected to enable the user to choose whether to process the video frames to reduce the disturbing phenomenon.

16. The method according to claim 1, wherein analyzing the video frames comprises comparing intensity of light in detected flashes with ambient light where the display is located to determine whether a difference between them is greater than a threshold.

17. The method according to claim 1, wherein processing the video frames comprises using a physical filter mask attached to the display and the physical filter mask is controlled based on user settings of the device.

18. The method according to claim 1, wherein processing the video frames comprises one or more of:
   filtering a detected flashing sequence such that an initial flash is either kept or set to have a brightness above a first threshold whereas subsequent flashes in the same sequence are reduced below a second threshold;
   filtering the video frames such that detected flashing is reduced in its luminance and at the same time changed in its color setting;
   separating detected flashes from video content and sending the flashes and the video content on different channels;
   reducing intensity levels for all the video frames under processing;
   adjusting a global contrast and brightness of the video frames;
   filtering the video frames taking into account a brightness value sequence stored in memory from a previous GOP so that a gradual smooth brightness transition is applied between two filtering sequences; or
   transforming the video frames into a frequency domain and filtering the video frames in the frequency domain for repetitive patterns and inverse transforming back the filtered video frames.

19. The method of claim 1, wherein partially decoded video frames are video frames generated after an entropy decoding part of the decoding process but before a prediction part of the decoding process.

20. The method of claim 1, wherein video frames in the received media stream are grouped into a plurality of GOPs, each GOP comprising an intra-predicted video frame and one or more inter-predicted video frames that are predicted from one or more reference frames, and wherein said processing comprises, if a disturbing spatial and/or temporal phenomenon is detected for any video frame in a GOP, filtering all video frames in the GOP to adjust luminance intensity levels, brightness, and/or contrast as needed to reduce the disturbing spatial and/or temporal phenomenon based on user settings of the device.

21. An image processing system comprising:
   a buffer; and
   processing circuitry configured to:
      receive, into the buffer, a media stream comprising sequences of video frames;
      analyze the video frames during streaming, wherein the analyzing is performed on partially decoded video frames within a Group of Picture (GOP) to detect disturbing spatial and/or temporal phenomena, wherein partially decoded video frames are video frames generated partway through a decoding process;
      if a disturbing spatial and/or temporal phenomenon is detected, process the video frames to reduce the disturbing spatial and/or temporal phenomenon based on user settings of the device; and
      output the processed video frames for display on the display.

22. An electronic device comprising:
   a display; and
   an image processing system comprising a buffer and processing circuitry configured to:
      receive, into the buffer, a media stream comprising sequences of video frames;
      analyze the video frames during streaming, wherein the analyzing is performed on partially decoded video frames within a Group of Picture (GOP) to detect disturbing spatial and/or temporal phenomena, wherein partially decoded video frames are video frames generated partway through a decoding process;
      if a disturbing spatial and/or temporal phenomenon is detected, process the video frames to reduce the disturbing spatial and/or temporal phenomenon based on user settings of the device; and
      output the processed video frames for display on the display.

* * * * *